US011772782B2

(12) United States Patent
Suzuki (10) Patent No.: US 11,772,782 B2
(45) Date of Patent: *Oct. 3, 2023

(54) ROTARY-WING AIRCRAFT

(71) Applicant: AERONEXT INC., Tokyo (JP)

(72) Inventor: Youichi Suzuki, Yamanashi (JP)

(73) Assignee: AERONEXT INC., Tokyo (JP)

( * ) Notice: Subject to any disclaimer, the term of this patent is extended or adjusted under 35 U.S.C. 154(b) by 459 days.

This patent is subject to a terminal disclaimer.

(21) Appl. No.: 17/080,795

(22) Filed: Oct. 26, 2020

(65) Prior Publication Data

US 2021/0039775 A1  Feb. 11, 2021

Related U.S. Application Data

(63) Continuation of application No. 15/574,828, filed as application No. PCT/JP2015/064381 on May 19, 2015, now Pat. No. 10,814,965.

(51) Int. Cl.
| | |
|---|---|
| *B64C 27/08* | (2023.01) |
| *B64C 17/02* | (2006.01) |
| *B64C 39/02* | (2023.01) |
| *B64D 47/08* | (2006.01) |
| *B64U 10/13* | (2023.01) |
| *B64U 30/20* | (2023.01) |
| *B64U 101/30* | (2023.01) |

(52) U.S. Cl.
CPC .............. *B64C 27/08* (2013.01); *B64C 17/02* (2013.01); *B64C 39/024* (2013.01); *B64D 47/08* (2013.01); *B64U 10/13* (2023.01); *B64U 30/20* (2023.01); *B64U 2101/30* (2023.01)

(58) Field of Classification Search
CPC ....... B64C 27/08; B64C 27/008; B64D 47/08; B64U 10/10; B64U 1430/20; B64U 1430/29; B64U 1430/296; B64U 2201/30
USPC ...................................... 244/17.23
See application file for complete search history.

(56) References Cited

U.S. PATENT DOCUMENTS

| | | | |
|---|---|---|---|
| 6,260,796 B1 | 7/2001 | Klingensmith | |
| 9,409,656 B2 | 8/2016 | Ohtomo et al. | |
| 11,513,538 B1 * | 11/2022 | Kaneria | G05D 1/106 |
| 11,541,801 B1 * | 1/2023 | Seeley | B63B 43/08 |
| 2011/0084162 A1 | 4/2011 | Goossen et al. | |
| 2011/0226892 A1 | 9/2011 | Crowther et al. | |
| 2014/0034775 A1 | 2/2014 | Hutson | |

(Continued)

FOREIGN PATENT DOCUMENTS

| | | | | |
|---|---|---|---|---|
| CA | 2876894 A1 * | 7/2015 | | G01C 11/00 |
| CN | 113148126 A * | 7/2021 | | B64C 27/006 |

(Continued)

OTHER PUBLICATIONS

International Search Report in PCT/JP2015/064381, dated Aug. 18, 2015, 4pp.

(Continued)

*Primary Examiner* — Christopher P Ellis (57) ABSTRACT

A center C of a connecting portion coincides with a center U of lift generated in a body of a rotary-wing aircraft. The center C of the connecting portion is a point of action of gravitational force of a support rod and a first mounting portion with respect to the connecting portion. The center U of the lift is a point of action of the lift on the rotary-wing aircraft and is the center of rotation of the connecting portion.

9 Claims, 7 Drawing Sheets

(56) References Cited

U.S. PATENT DOCUMENTS

| | | |
|---|---|---|
| 2014/0055613 A1 | 2/2014 | Ohtomo et al. |
| 2014/0119716 A1 | 5/2014 | Ohtomo et al. |
| 2014/0138477 A1 | 5/2014 | Keennon et al. |
| 2014/0240498 A1* | 8/2014 | Ohtomo ............... B64D 47/08 |
| | | 348/144 |
| 2014/0263823 A1 | 9/2014 | Wang et al. |
| 2015/0021429 A1 | 1/2015 | Reichert |
| 2022/0361399 A1* | 11/2022 | Schaad ................ A01D 34/64 |
| 2022/0396369 A1* | 12/2022 | Hartkop ............... B64C 39/024 |
| 2022/0411052 A1* | 12/2022 | Angelucci ............ B64U 20/83 |
| 2023/0012473 A1* | 1/2023 | Nakamura ........... H01M 50/249 |
| 2023/0016831 A1* | 1/2023 | Merrick ................ B64C 39/02 |

FOREIGN PATENT DOCUMENTS

| | | | |
|---|---|---|---|
| EP | 2772725 A2 | 9/2014 | |
| EP | 4137414 A1 * | 2/2023 | ............. B64D 27/24 |
| JP | 2002-370696 A | 12/2002 | |
| JP | 2007-261414 A | 10/2007 | |
| JP | 2013-79034 A | 5/2013 | |
| JP | 2013-79043 A | 5/2013 | |
| JP | 2013-189036 A | 9/2013 | |
| JP | 2014-167413 A | 9/2014 | |
| KR | 100812756 B1 * | 5/2020 | |
| WO | 99/38769 A1 | 8/1999 | |
| WO | 2010/128489 A2 | 11/2010 | |
| WO | WO-2020032262 A1 * | 2/2020 | ............. B64C 25/68 |
| WO | WO-2021131427 A1 * | 7/2021 | ............. B64C 27/08 |

OTHER PUBLICATIONS

Written Opinion of the ISA in PCT/JP2015/064381, dated Aug. 18, 2015, 10pp.
Office Action in JP Application No. 2017-518270, dated Jun. 5, 2017, 6pp.
Office Action in JP Application No. 2017-518270, dated Oct. 6, 2017, 7pp.
Office Action in EP Application No. 15892572.7, dated Aug. 2, 2019, 5pp.
Search Report in SG Application No. 11201709198W, dated Aug. 24, 2018, 3pp.
Written Opinion in SG Application No. 11201709198W, dated Aug. 29, 2018, 6pp.
Office Action in KR Application No. 10-2017-7031019, dated Aug. 21, 2018, 7pp.
Office Action in KR Application No. 10-2017-7031019, dated Feb. 22, 2019, 5pp.
Helicopter Flying Handbook Chapter 2, "Aerodynamics of Flight", p. 2-1 to 2-28, Apr. 28, 2015, 28pp.
Communication under Rule 71(3) EPC dated Dec. 16, 2022 for European Patent Application No. 21193083.9.

* cited by examiner

ROTARY-WING AIRCRAFT

RELATED APPLICATIONS

The present application is a continuation of U.S. patent application Ser. No. 15/574,828 filed on Nov. 16, 2017, which is a National Phase of International Application Number PCT/JP2015/064381, filed May 19, 2015.

TECHNICAL FIELD

The present invention relates to a rotary-wing aircraft having a plurality of rotary wings.

BACKGROUND ART

Aerial photography using a rotary-wing aircraft called a drone or multicopter may be carried out in various events such as sports and concerts, investigation of building facilities such as buildings and condominiums, and the like. This type of rotary-wing aircraft is being applied not only to aerial photography applications but also to the field of transportation of luggage and the like. Patent Literature 1 discloses a rotary-wing aircraft system for aerial photography including a rotary-wing aircraft including a plurality of rotary wings, a support portion disposed vertically downward from a center portion of the rotary wing aircraft, a mounting portion disposed at an end vertically below the support portion, and an anchoring rope connected to the bottom of the mounting portion, one end of the anchoring rope being connected to the vertically lower end of the mounting portion, the other end of the anchoring rope being anchored to the ground.

CITATION LIST

Patent Literature

Patent Literature 1: JP 2013-79043 A

SUMMARY OF INVENTION

Technical Problem

Figure 13:
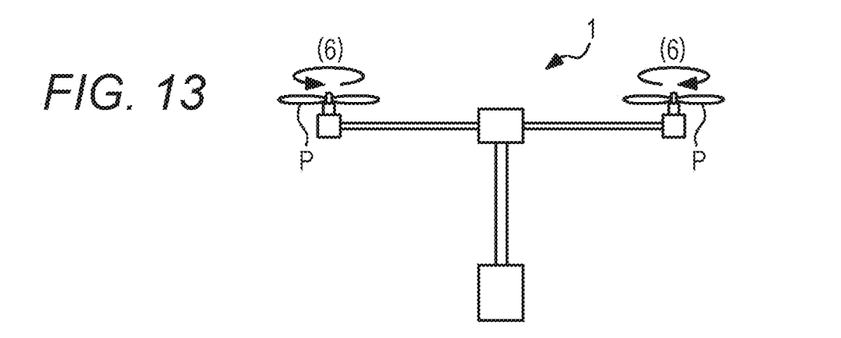
FIG. 13 is a side view of a conventional rotary-wing aircraft.
Figure 14:
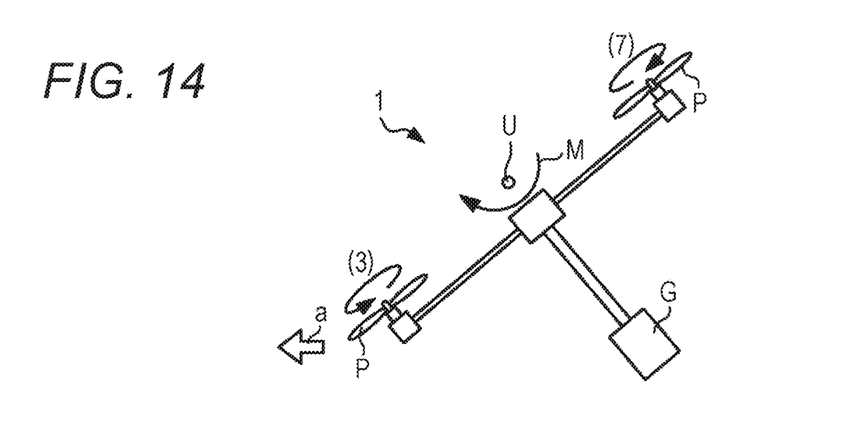
FIG. 14 is a side view when the conventional rotary-wing aircraft moves horizontally.
Figure 15:
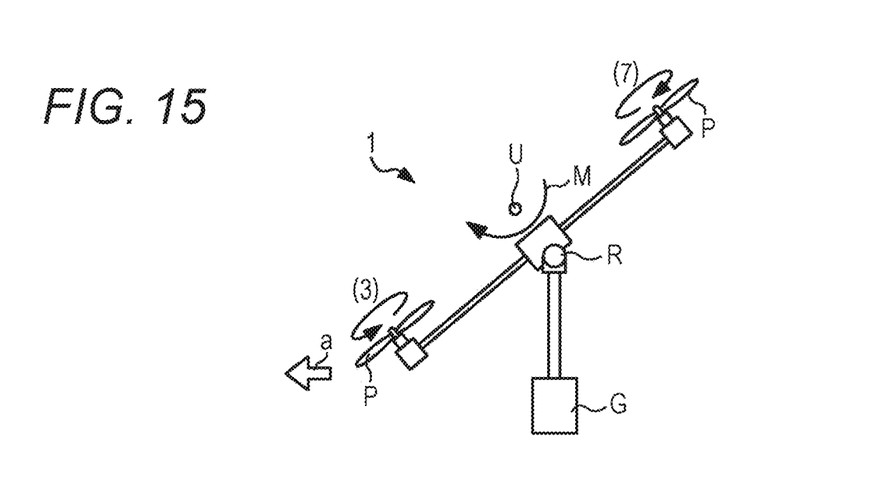
FIG. 15 is a side view when a conventional rotary-wing aircraft including a joint member moves horizontally.

A rotary-wing aircraft 1 rotates each rotary wing P at the same rotational speed (more precisely the same number of rotation per unit time, the same applies hereafter) in the posture as shown in FIG. 13 and floats upward. At this time, assuming that, for example, the upper limit of a rotational speed level is 10, the rotational speed level at the time of ascending is set to 6 (parenthesized numbers in the figure, the same applies hereafter). When the rotary-wing aircraft 1 reaches a desired altitude, the rotary-wing aircraft stops in the air (hovers) by lowering the rotational speed to such a degree that the lift by each rotary wing P and the gravity on the body thereof are balanced. At this time, the rotational speed level is set to 5, for example. When the rotary-wing aircraft 1 moves in the horizontal direction, the rotational speed of the rotary wings P located on the front side in the traveling direction is decreased (for example, to a rotational speed level of 3), and the rotational speed of the rotary wings P on the rear side in the traveling direction is increased (for example, to a rotational speed level of 7). As a result, as shown in FIG. 14, the rotary-wing aircraft 1 moves in the direction of an arrow while maintaining a posture inclined downward toward the front side in the traveling direction. When the body of the rotary-wing aircraft 1 is inclined, a rotational moment M caused by a heavy load G such as a camera is generated around a center U of the lift. Therefore, in order to cancel this rotational moment M and maintain the same posture, it is necessary to increase the rotational speed of the rotary wings P located behind the rotary wings P located on the front side in the traveling direction.

Patent Literature 1 (especially FIGS. 7 and 8) discloses a mechanism capable of performing, by providing a joint member R, adjustment such that a heavy load G is positioned vertically below the rotary-wing aircraft 1 irrespective of the posture of the rotary-wing aircraft 1. However, even if such a mechanism is adopted, as shown in FIG. 14, since the joint member R supporting the heavy load G and the center U of the lift do not completely coincide, the rotational moment M is generated around the center U of the lift to some degree. Therefore, a slight difference needs to be provided between the rotational speeds of the rotary wings such that, for example, the rotational speed level of the rotary wings P on the front side in the traveling direction is set to 4 and the rotational speed level of the rotary wings P on the rear side in the traveling direction is set to 6.

In this way, when there is a difference between the rotational speeds of the rotary wings P on the front side and the rear side in the traveling direction for the rotary-wing aircraft 1 to travel in the horizontal direction, the output of the rotary wings P on the rear side in the traveling direction must be maintained at a high level over a period of movement in the horizontal direction. Therefore, various problems such as failure caused by heat generation of a motor or the like can be considered.

Considering above, an object of the present invention to reduce, in a case where a rotary-wing aircraft including a plurality of rotary wings travels in a direction including the horizontal direction, the difference in the rotational speeds of the rotary wings on the front side and on the rear side in the traveling direction compared with a conventional case.

Solution to Problem

In order to solve the problem described above, the present invention provides a rotary-wing aircraft including a plurality of rotary wings, an arm portion that supports the plurality of rotary wings, a first mounting portion for mounting an object, and a connecting portion that connects the first mounting portion to the arm portion in a state in which the first mounting portion is movable within a predetermined range, and a center of lift generated in a body by rotation of the plurality of rotary wings is present at a position of the connecting portion.

The rotary-wing aircraft described above may be configured such that, in a case of moving in a direction including a horizontal direction, a posture of the body is changed by making a rotational speed of a rotary wing located on a rear side in a traveling direction higher than a rotational speed of a rotary wing located on a front side in the traveling direction, and, after the posture of the body is changed, movement in the direction including the horizontal direction is caused by reducing a difference between the rotational speed of the rotary wing located on the front side in the traveling direction and the rotational speed of the rotary wing located on the rear side in the traveling direction.

In addition, the rotary-wing aircraft described above may be configured such that the connecting portion connects a second mounting portion that is disposed on an opposite side to the first mounting portion as viewed from the connecting portion and connected to the first mounting portion to the arm portion together with the first mounting portion.

An antenna for receiving a signal for positioning may be mounted on the second mounting portion.

The rotary-wing aircraft described may include a center-of-gravity moving mechanism for moving the center of gravity of the body.

DESCRIPTION OF EMBODIMENTS

Embodiment

Figure 1:
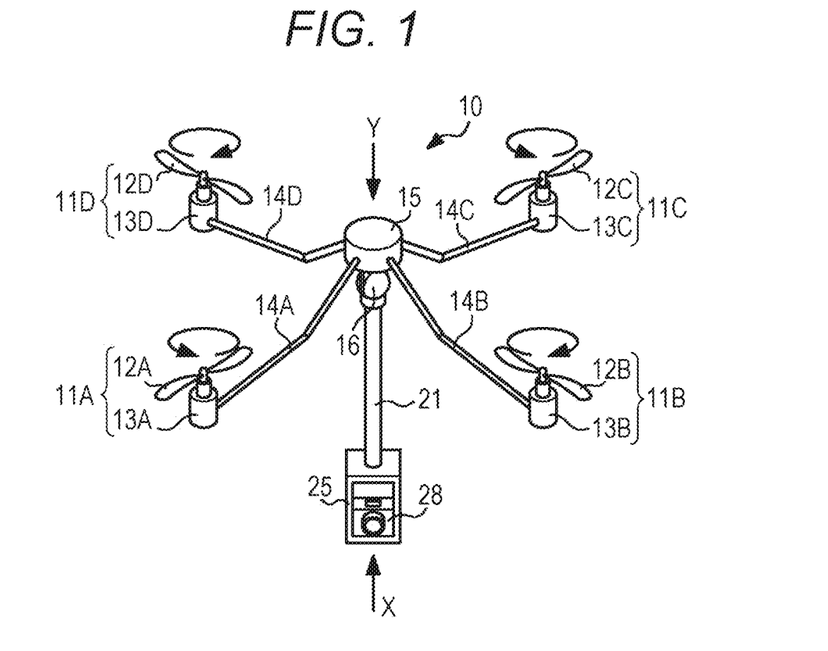
FIG. 1 is a perspective view showing a configuration of a rotary-wing aircraft according to an embodiment of the present invention.
Figure 2:
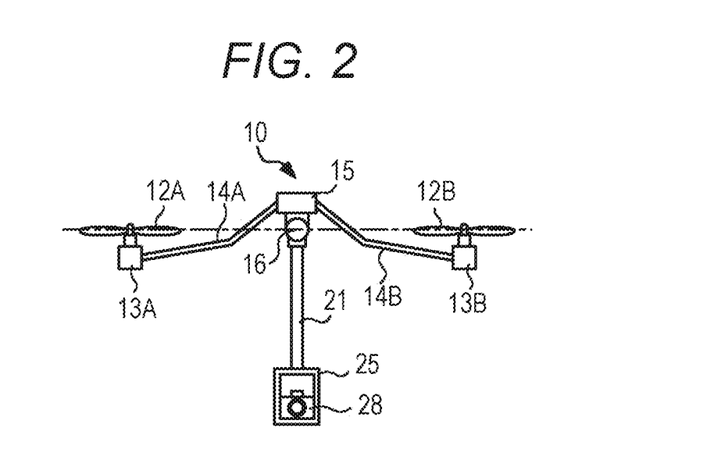
FIG. 2 is a side view of the rotary-wing aircraft according to the embodiment.
Figure 3:
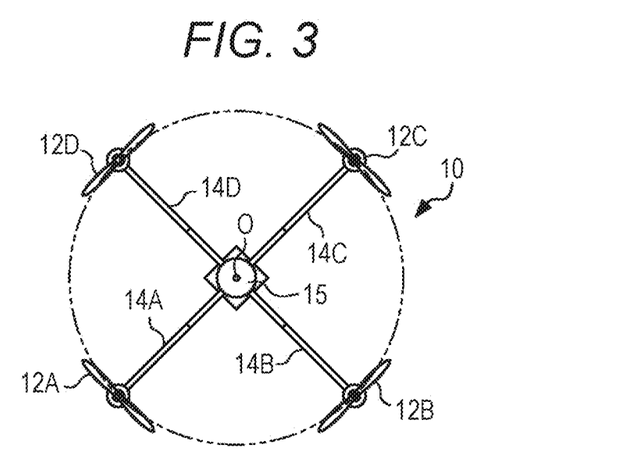
FIG. 3 is a plan view of the rotary-wing aircraft according to the embodiment.

FIG. 1 is a perspective view showing a configuration of a rotary-wing aircraft 10 according to an embodiment of the present invention, FIG. 2 is a side view of the rotary-wing aircraft 10 as viewed from the direction of an arrow X in FIG. 1, and FIG. 3 is a plan view of the rotary-wing aircraft 10 as viewed from the direction of an arrow Y in FIG. 1. In the present embodiment, a multicopter of a four-rotor type will be described as an exemplary rotary-wing aircraft including a plurality of rotary wings.

A center portion 15 of the rotary-wing aircraft 10 is provided at the center of the rotary-wing aircraft 10 as viewed from above. From a side surface of the center portion 15, four arm portions 14A, 14B, 14C, and 14D are arranged at equal intervals, that is, such that an angle formed by the longitudinal directions of the adjacent arm portions is 90 degrees. The arm portions 14A, 14B, 14C, and 14D are means for supporting rotary wing portions 11A, 11B, 11C, and 11D, respectively. Since the arm portion 14A and the rotary wing portion 11A, the arm portion 14B and the rotary wing portion 11B, the arm portion 14C and the rotary wing portion 11C, the arm portion 14D and the rotary wing portion 11D each have the same configuration, the configurations of the arm portion 14A and the rotary wing portion 11A will be described as an example. In the present embodiment, the arm portions 14A, 14B, 14C, and 14D are formed so as not to interfere with the rotary wings 12A, 12B, 12C, and 12D, respectively, and so as to avoid the movable ranges thereof, and have bent shapes that are downwardly convex. However, as long as the arm portions 14A, 14B, 14C, and 14D do not interfere with the rotary wings 12A, 12B, 12C, and 12D, it is not necessarily required for the arm portions 14A, 14B, 14C, and 14D to have the shapes exemplarily shown in FIG. 1.

A rotary wing portion 11A is attached to a distal end portion of the arm portion 14A farther from the center portion 15. The rotary wing portion 11A includes rotary wings 12A and a power portion 13A. The rotary wings 12A are means for converting an output from the power portion 13A into propulsive force of the rotary-wing aircraft 10. Although the rotary wings 12A illustrated in the figure are two wings, the rotary wings 12A may include three or more wings. The power portion 13A is, for example, a power generating means such as an electric motor or an internal combustion engine. In the present embodiment, it is assumed that two electric motors (right rotation motor and left rotation motor) having different rotation directions are used as power portions 13A, 13B, 13C, and 13D, the power portions 13A and 13C are left rotation motors, and the power portions 13B and 13D are right rotation motors. The power portion 13A is fixed to the arm portion 14A, and a rotation shaft of the power portion 13A is fixed to the rotary wing 12A. As shown in FIG. 3, rotary shafts of the rotary wing portions 11A, 11B, 11C, and 11D are arranged at equal intervals on a concentric circle centered on the center portion 15 as viewed from above.

A first mounting portion 25 is a means for mounting an object, and, for example, a camera 28 for performing aerial photography, a driving mechanism (not shown) for changing the direction of the camera, a control device (not shown) for controlling the camera 28 and the driving mechanism are mounted thereon. The control device controls shooting operation of the camera 28, panning operation of rotating the camera 28 leftward or rightward, tilting operation of vertically tilting the camera 28, and the like. Further, in the rotary-wing aircraft 10, a power source for driving the power portions 13A, 13B, 13C, and 13D, the camera 28, the control device and the like, a receiver for radio control, and a level gauge for grasping a posture of the rotary-wing aircraft 10 (none of these are shown) are mounted as necessary, but these may be mounted on the first mounting portion 25 or may be mounted in a space provided in the center portion 15 described above. Also, the control device may be mounted in the space provided in the center portion 15.

A connecting portion 16 is fixed to a lower surface of the center portion 15. The connecting portion 16 is means for connecting the first mounting portion 25 to the arm portions 14A, 14B, 14C, and 14D via a support rod 21 and the center portion 15 such that the first mounting portion 25 can move within a predetermined range with respect to the body of the rotary-wing aircraft 10. The connecting portion 16 is a joint mechanism such as a ball joint and rotatably supports the first mounting portion 25 and the support rod 21. In the present embodiment, the connecting portion 16 supports the first mounting portion 25 and the support rod 21 such that the first mounting portion 25 and the support rod 21 are rotatable within a substantially hemispherical range below the rotary-wing aircraft 10 and within a range in which the first mounting portion 25 and the support rod 21 do not contact the arm portions 14A, 14B, 14C, and 14D. The connecting portion 16 is fixed to an upper end of the support rod 21, and a first mounting portion 25 is fixed to a lower end of the support rod 21. The support rod 21 and the first mounting portion 25 are maintained in a state of being hung vertically downward from the rotary-wing aircraft 10 by the action of gravity regardless of the posture of the rotary-wing aircraft 10.

A pilot operates a transmitter for radio control provided with an operation portion to operate the rotary-wing aircraft 10. When a receiver receives a radio signal transmitted from the transmitter, the control device of the rotary-wing aircraft 10 controls components of the rotary-wing aircraft 10 such as the power portions 13A, 13B, 13C, and 13D, and the camera 28 on the basis of the radio signal.

Figure 4:
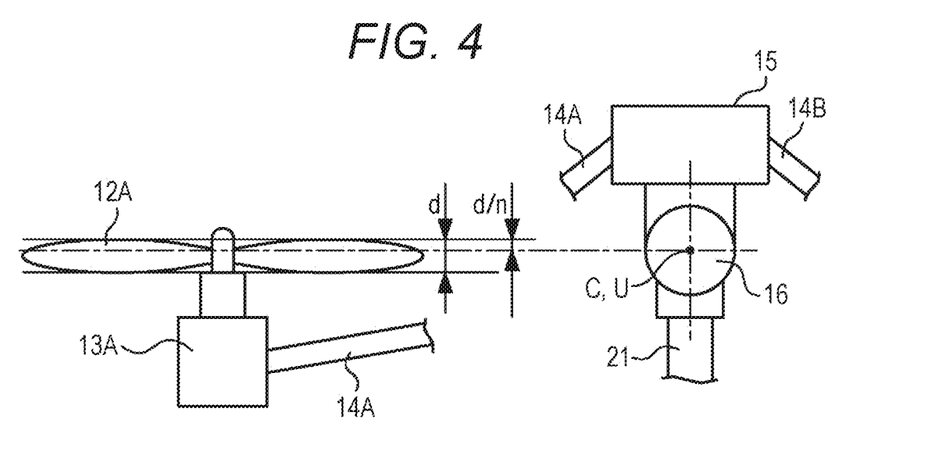
FIG. 4 is a conceptual diagram illustrating a center of lift.

As shown in FIG. 4, a center C of the connecting portion 16 coincides with a center U of the lift generated in the body of the rotary-wing aircraft 10 as the four rotary wings 12A, 12B, 12C, and 12D rotate. Here, the center C of the connecting portion 16 is a point of action, on the connecting portion 16, of gravity applied to the support rod 21, the first mounting portion 25 and the object mounted on the first mounting portion 25, and is a center of rotation of the connecting portion 16. The center U of the lift is a point of action, on the rotary-wing aircraft 10, of the lift generated by the rotation of the rotary wings 12A, 12B, 12C, and 12D. More specifically, when the width in the short direction of each of the rotary wings 12A, 12B, 12C, and 12D is d, lift generated by each of the rotary wings 12A, 12B, 12C, and 12D acts on a position of d/n from an upper end of each rotary wing in the width direction thereof (for example, n is 3). In addition, the center of concentric circles on a plane passing through the position of d/n from the upper end of each of the rotary wings 12A, 12B, 12C, and 12D in the width direction thereof, and through which rotation shafts of the rotary wings 12A, 12B, 12C, and 12D illustrated in FIG. 3 pass is the center U of the lift.

As described above, since the center U of the lift generated in the body of the rotary-wing aircraft 10 is the point of action of gravitational force of a heavy load (the support bar 21, the first mounting portion 25, and the objects mounted on the first mounting portion 25) and is located at the connecting portion 16 which is the center of rotation, even when the body of the rotary-wing aircraft 10 is inclined, just gravitational force in the vertical direction due to the heavy load acts on the center U of the lift and no rotational moment due to gravitational force of the heavy load acts around the center U of the lift.

Figure 5A:
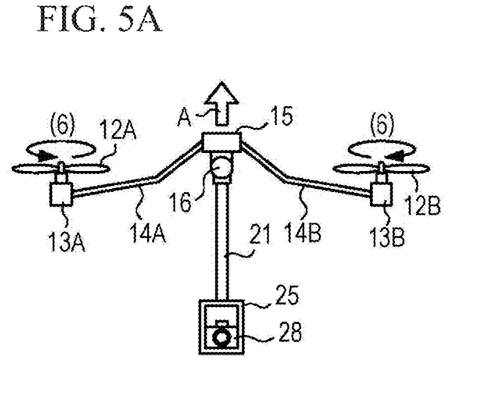
FIGS. 5A-5C are side views showing a posture change of the rotary-wing aircraft according to the embodiment.

Next, with reference to FIGS. 5A to 5C, change in posture of the rotary-wing aircraft 10 will be described. When an operator performs an operation to ascend the rotary-wing aircraft 10 using the operation portion of the transmitter, under the control of the control device according to this operation, the rotational speeds of the power portions 13A, 13B, 13C, and 13D increase, and the rotational speeds of the rotary wings 12A, 12B, 12C, 12D attached to the power portions 13A, 13B, 13C, and 13D also increase. As a result, the rotary wings 12A, 12B, 12C, and 12D gradually generate the lift necessary for ascent of the rotary-wing aircraft 10. When the lift exceeds the gravity exerted on the rotary-wing aircraft 10, as shown in FIG. 5A, the rotary-wing aircraft 10 starts floating in the air and floats in the direction of the arrow A. At this time, assuming that, for example, the upper limit of the rotational speed level of the rotary wings 12A, 12B, 12C, and 12D is 10, the rotational speed levels of the rotary wings 12A, 12B, 12C, and 12D at the time of ascent are each 6 and the same. When the rotary-wing aircraft 10 arrives at a desired altitude, the operator operates the transmitter to adjust the rotational speeds of the rotary wings 12A, 12B, 12C, and 12D such that the rotary-wing aircraft 10 stops in the air (hovers). That is, the rotational speed at this time is the rotational speed at which the lift generated by the rotation of each of the rotary wings 12A, 12B, 12C, and 12D is balanced with the gravity on the rotary-wing aircraft 10, and, for example, the rotational speed level is 5.

Next, when the rotary-wing aircraft 10 moves in the horizontal direction, the operator operates the transmitter to adjust the rotational speeds of the rotary wings 12B and 12C located on the rear side in the traveling direction to be higher than the rotational speeds of the rotary wings 12A and 12D located on the front side in the traveling direction. At this time, for example, the rotational speed levels of the rotary wings 12B and 12C located on the rear side are set to 6, and the rotational speed levels of the rotary wings 12A and 12D located on the front side are set to 4. As a result, the lift by the rotary wings 12B and 12C on the rear side is larger than the lift by the rotary wings 12A and 12D on the front side, and the positions of the rotary wings 12B are 12C are higher than the positions of the rotary wings 12A and 12D. Therefore, as shown in FIG. 5B, the body of the rotary-wing aircraft 10 is in a posture inclined downward toward the front side in the traveling direction.

As soon as such a posture is reached, the operator operates the transmitter and adjusts the rotational speed of each of the rotary wings 12A, 12B, 12C, and 12D to such rotational speed that each of the rotary wings 12A, 12B, 12C, and 12D is moved in the horizontal direction at a desired speed. For example, the rotational speed levels of the rotary wings 12A, 12B, 12C, and 12D at this time are all set to 5. Conventionally, the posture of the body cannot be maintained and horizontal movement cannot be realized unless the rotational speeds of the rotary wings on the rear side in the traveling direction are greater than the rotational speeds of the rotary wings on the front side in the traveling direction. However, in the present embodiment, it is possible to move the rotary-wing aircraft 10 in the direction of an arrow B as shown in FIG. 5C while keeping the rotational speeds of the rotary wings 12A, 12B, 12C, and 12D the same.

Figure 5B:
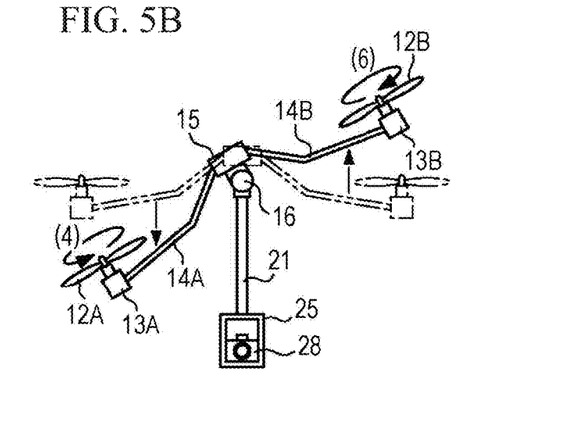
Figure 5C:
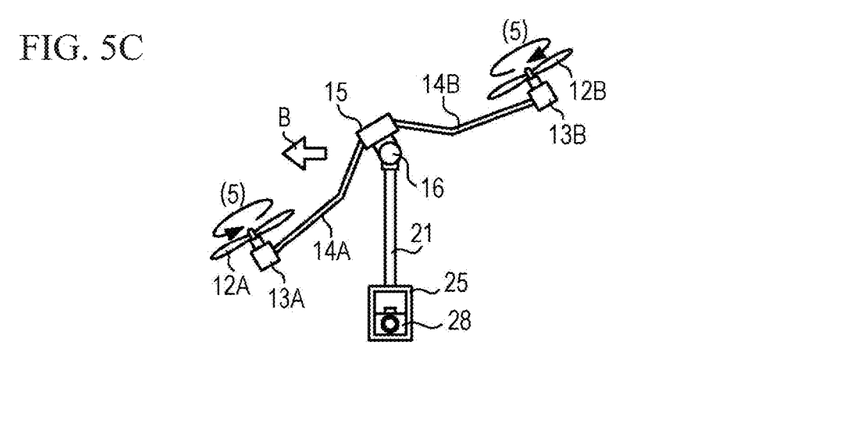

As shown in FIGS. 5B and 5C, when the body of the rotary-wing aircraft 10 is in a posture inclined downward toward the front side in the traveling direction, the gravitational force of the heavy load below the support rod 21 acts on the connecting portion 16. However, as described above, the point of action of gravity (the center C of the connecting portion 16) on the connecting portion 16 coincides with the center U of the lift. For this reason, no rotational moment due to the gravitational force of the heavy load below the support rod 21 occurs around the center U of the lift. Therefore, the rotational speeds of the rotary wings 12A, 12B, 12C, and 12D can be kept the same.

Figure 6:
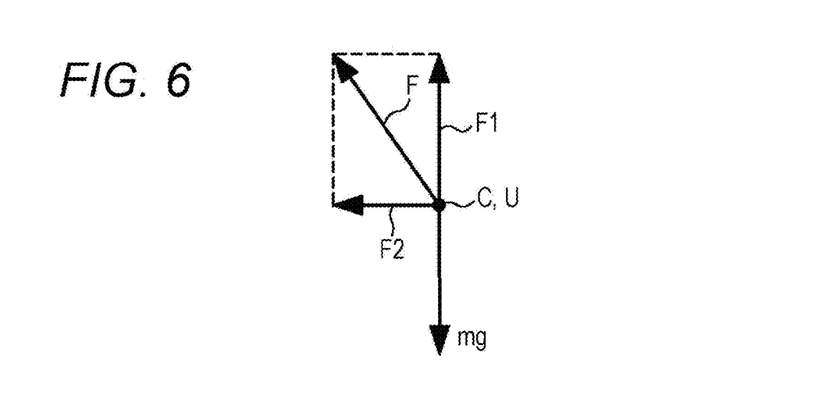
FIG. 6 is a conceptual diagram illustrating a dynamic relationship in the rotary-wing aircraft according to the embodiment.

This will be described from the viewpoint of dynamics. As shown in FIG. 6, the gravitational force mg caused of the mounted objects such as the support rod 21, the first mounting portion 25, the camera 28, etc., and the lift F generated by the rotary wings 12A and 12B, 12C, and 12D are force acting on the center U of the lift (the center C of the connecting portion). The direction of the gravitational force mg is a vertically downward direction and the direction of the lift F is an upward direction perpendicular to a plane passing through the position of d/n from the upper end of each of the rotary wings 12A, 12B, 12C, and 12D in the width direction. When the lift F is divided into a component force F1 in a direction parallel to the direction of the gravitational force mg and a component force F2 in a direction perpendicular to the direction of the gravitational force mg, the component force F1 balances with the gravitational force mg and the component force F2 acts as propulsive force of the rotary-wing aircraft 10 in the horizontal direction. As a result of the component forces F1 and F2, the rotary-wing aircraft 10 moves in the horizontal direction while maintaining the altitude.

As described above, according to the present embodiment, in the case where the rotary-wing aircraft 10 travels in the horizontal direction, by making the difference between the rotational speeds of the rotary wings on the front side and on the rear side in the traveling direction smaller than the conventional difference, the difference can be made, for example, zero.

Making the difference between the rotational speeds of the rotary wings on the front side and on the rear side in the traveling direction smaller than the conventional difference has the following advantages. First, during a period in which the rotary-wing aircraft 10 moves in the horizontal direction, it is not necessary that the output of the rotary wings on the rear side in the traveling direction is considerably higher (high output enough to eliminate the rotational moment M generated conventionally) than the output on the front side in the traveling direction. Therefore, when the power portion is a motor, the possibility of failure due to heat generation or the like is reduced, and there is generated a room for using a downgraded power portion with lower output performance than a conventional power portion. If it is acceptable to downgrade the power portion in this manner, it is also possible to reduce the weight and cost of the entire body of the rotary-wing aircraft, and as a result, it is possible to enjoy improved fuel efficiency and economical merit.

In addition, in the case where a difference is provided between the rotational speeds of the rotary wings on the front side and on the rear side in the traveling direction as in a conventional case, the rotational speeds of the rotary wings on the front side in the traveling direction become relatively lower, and, even if the output of the power portion on the rear side is increased, part of the output must be used to eliminate the rotational moment. Therefore, as a result, the average rotational speed of all the rotary wings does not increase so much. For this reason, the traveling speed of the rotary-wing aircraft does not become so fast, and the weight of heavy load that can be transported by the rotary-wing aircraft cannot be made so large. In contrast, according to the present embodiment, the output of the power portions 13A, 13B, 13C, and 13D does not have to be used for eliminating the rotational moment, and the ratio at which the output is used for the propulsive force of the rotary-wing aircraft can be increased compared with a conventional case. Therefore, it contributes to improvement of the traveling speed of the rotary-wing aircraft, and it also enables transporting heavier loads.

In addition, in the case of a transportation application in which a package is transported by a rotary-wing aircraft and the package is separated in the air above the destination and dropped to the destination, in the conventional configuration, at the moment when the package is separated from the rotary-wing aircraft, the rotational moment M drops by an amount corresponding to the weight of the package, and further, since there is a difference in the rotational speed level between the front side and the rear side in the traveling direction, the behavior of the body of the rotary-wing aircraft becomes extremely unstable. In contrast, according to the present embodiment, no rotational moment is generated and there is no difference in the rotational speed level between the front side and the rear side in the traveling direction. Therefore, there is no room for change in the rotational moment even if the load is separated, and thus the above problem does not occur.

[Modification]

The above embodiment may be modified as follows.

[First Modification]

A center-of-gravity moving mechanism for moving the center of gravity of the body of the rotary-wing aircraft may be provided.

Figure 7:
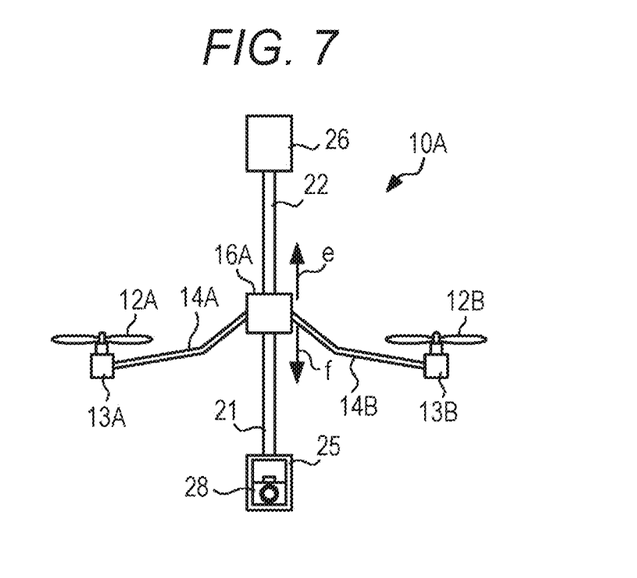
FIG. 7 is a side view of a rotary-wing aircraft according to a modification of the present invention.
Figure 8:
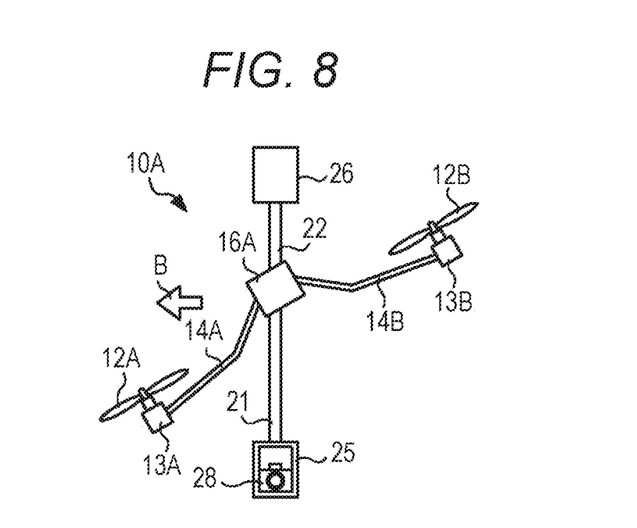
FIG. 8 is a side view showing a posture change of a rotary-wing aircraft according to the modification.

FIG. 7 is a side view of a rotary-wing aircraft 10A according to the first modification, and FIG. 8 is a side view showing a posture change of the rotary-wing aircraft 10A. A connecting portion 16A connects a second mounting portion 26 disposed on the side opposite to the first mounting portion 25 as viewed from the connecting portion 16A to the arm portions 14A, 14B, 14C, and 14D together with the first mounting portion 25. The second mounting portion 26 is connected to the first mounting portion 25 via the support rod 21 and a support rod 22. In addition to a power source, a receiver, a control device, a horizontal device, or the like, an antenna or the like for receiving a signal for positioning (for example, a GPS signal) may be mounted on the second mounting portion 26. The support rod 21 and the support rod 22 are one rod-like member extending in one direction, and is swingable, with respect to the body, around the connecting portion 16A such as a ball joint, and within a range in which the support rod 21 and the support rod 22 do not interfere with the arm portions 14A, 14B, 14C, and 14D and the rotary wing portions 11A, 11B, 11C, and 11D.

Further, the first mounting portion 25, the second mounting portion 26, and the support rods 21 and 22 are vertically movable with respect to the connecting portion 16A by, for example, a rack and pinion mechanism or the like provided in the connecting portion 16A. When the first mounting portion 25 and the second mounting portion 26 are moved downward (in the direction of an arrow f) by the mechanism for vertical movement, the weight on the first mounting portion 25 side is larger than the weight on the second mounting portion 26 side as viewed from the connecting portion 16A. As a result of this, the position of the center of gravity of the body of the rotary-wing aircraft 10A descends. In this case, regardless of the posture of the rotary-wing aircraft 10, due to the action of gravity, a state in which the first mounting portion 25 is positioned below the rotary-wing aircraft 10 in the vertical direction and the second mounting portion 26 is positioned above the rotary-wing aircraft 10 in the vertical direction can be maintained. In contrast, in the case where the first mounting portion 25 and the second mounting portion 26 are moved upward (in the direction of an arrow e) by the mechanism for vertical movement, the weight on the second mounting portion 26 side is larger than the weight on the first mounting portion 25 side as viewed from the connecting portion 16A, and the position of the center of gravity of the body of the rotary-wing aircraft 10A ascends. That is, the connecting portion 16A, the first mounting portion 25, the second mounting portion 26, and the support rods 21 and 22 constitute a center-of-gravity moving mechanism that moves the center of gravity of the body of the rotary-wing aircraft.

According to the first modification, the rotary-wing aircraft 10A can be moved in the horizontal direction by the same control as in the above embodiment, as shown in FIG. 8, and while maintaining the rotational speeds of the rotary wings 12A, 12B, 12C, and 12D the same. Furthermore, in the case where an antenna for receiving a signal for positioning (for example, a GPS signal) is mounted on the second mounting portion 26, if the weight on the first mounting portion 25 side is larger than the weight on the second mounting portion 26 side as viewed from the connecting portion 16A, the direction of the antenna can always be kept constant (that is, the antenna always faces upward in the vertical direction), and thus the directivity and gain of the antenna can be kept constant. Further, the position of the center of gravity of the rotary-wing aircraft 10A can be changed by vertically moving the first mounting portion 25, the second mounting portion 26, and the support rods 21 and 22 with respect to the connecting portion 16A, and such change in the center of gravity is effective for maintaining the posture of the rotary-wing aircraft 10 when any one of the rotary wing portions 11A, 11B, 11C, and 11D fails. Specifically, when the center of gravity of the body and the posture of the body are changed such that the center of gravity of the body of the rotary-wing aircraft 10A is brought close to the rotary wing portion that has failed and stopped, the flight can be continued with only the remaining rotary wing portions.

[Second Modification]

Although the first mounting portion 25 or the second mounting portion 26 is freely rotatable under the action of gravity around the connecting portion 16 or 16A in the embodiment and the first modification described above, movement of these may be actively controlled in accordance with the operation of the operator by using a power portion such as a motor or an auxiliary propeller. For example, in the case of the embodiment described above, a driving mechanism that makes the support rod 21 variable with respect to the arm portions 14A, 14B, 14C, and 14D with the connecting portion 16 as a starting point, and a motor for driving the driving mechanism are provided in the rotary-wing aircraft 10. The operator operates the transmitter, and, when the rotary-wing aircraft 10 arrives at a desired altitude, the operator causes the posture of the rotary-wing aircraft 10 to be inclined downward toward the front side in the traveling direction by setting the rotational speeds of the rotary wings 12B and 12C on the rear side in the traveling direction to be larger than the rotational speeds of the rotary wings 12A and 12D on the front side in the traveling direction, and further performs control, by using the driving mechanism described above, such that the first mounting portion 25 is positioned below the connecting portion 16 in the vertical direction in accordance with the inclination. This control may be performed manually by the operator, or may be performed automatically by the control device of the rotary-wing aircraft 10 on the basis of the inclination of the rotary-wing aircraft 10 on the basis of a predetermined control algorithm. In addition, two auxiliary propellers may be provided on the first mounting portion 25 to generate propulsive forces in two mutually perpendicular directions as viewed from above, and the position of the first mounting portion 25 may be controlled by the propelling forces of the auxiliary propellers. As described above, the connecting portion may be connected to the arm portions such that the first mounting portion can be moved by gravity, or the connecting portion may be connected to the arm portions such that the first mounting portion can be moved by the power portion.

[Third Modification]

Figure 9:
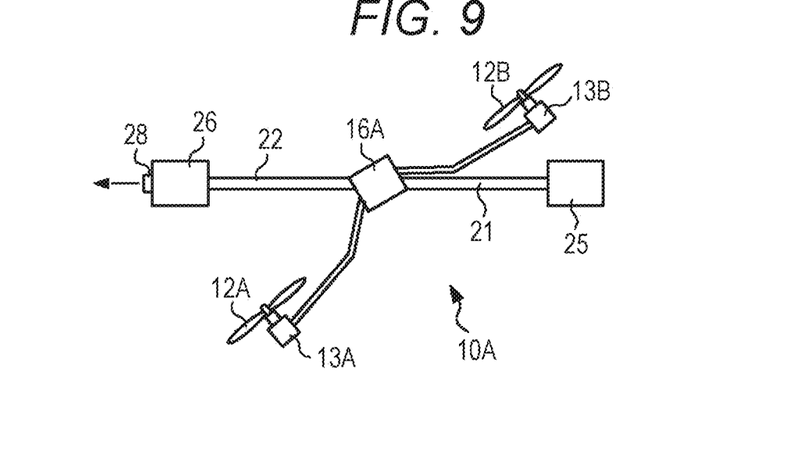
FIG. 9 is a perspective view showing a configuration of a rotary-wing aircraft according to another modification of the present invention.

In the first modification, if the weight on the first mounting portion 25 side and the weight on the second mounting portion 26 side are made the same as viewed from the connecting portion 16A, as shown in FIG. 9, the postures of the support rod 21 and the support rod 22 can be maintained horizontal when the rotary-wing aircraft 10A moves in the horizontal direction. In this case, if the camera 28 is mounted on, for example, the second mounting portion 26, the imaging direction of the camera 28 will be the traveling direction of the rotary-wing aircraft 10, and thus the possibility of, for example, the rotary wings 12A and the like entering the imaging range of the camera 28 and getting in the way can be reduced. In addition, as compared with the case where the postures of the support rod 21 and the support rod 22 are vertical, in the case where the postures of the support rod 21 and the support rod 22 are horizontal, it is possible to reduce air resistance of the body when traveling in the horizontal direction.

[Fourth Modification]

Figure 10:
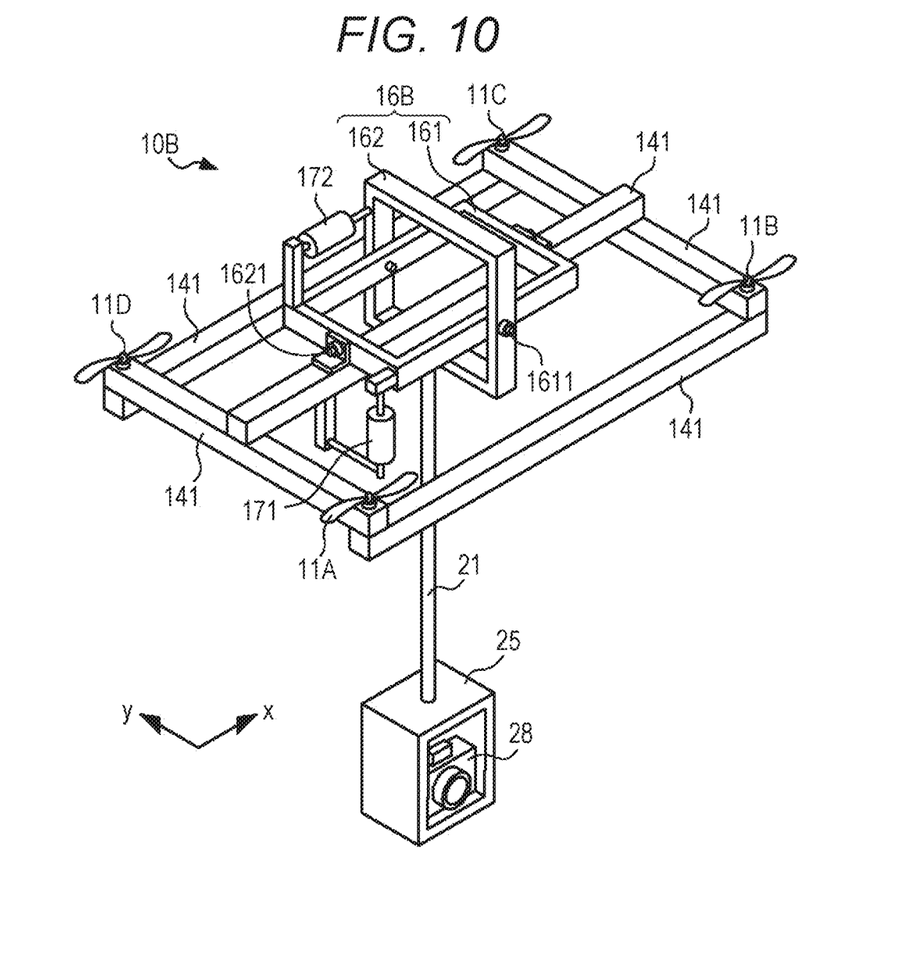
FIG. 10 is a perspective view of a rotary-wing aircraft according to still another modification of the present invention.
Figure 11:
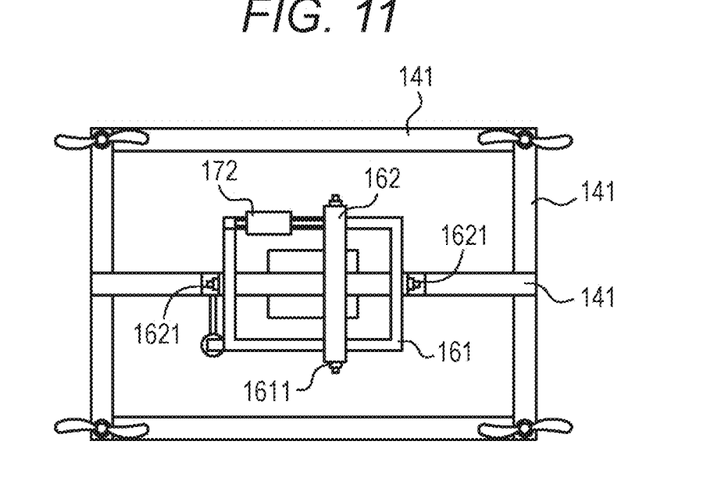
FIG. 11 is a plan view of a rotary-wing aircraft according to the modification.
Figure 12:
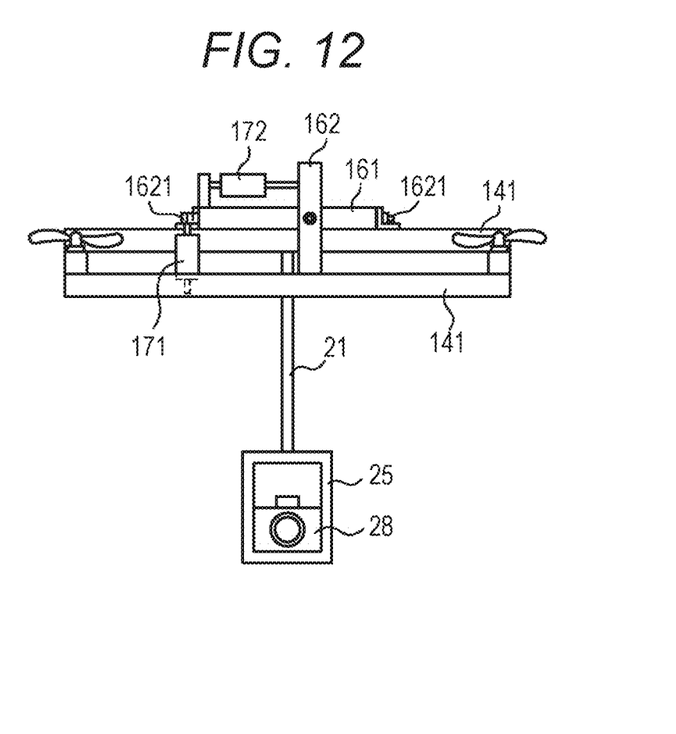
FIG. 12 is a side view of a rotary-wing aircraft according to the modification.

The structure of the rotary-wing aircraft is not limited to that exemplified in the embodiment, and may be, for example, a structure as shown in FIGS. 10 to 12. A rotary-wing aircraft 10B according to the fourth modification is configured such that arm portions 141 supporting the rotary wing portions 11A, 11B, 11C, and 11D have a rectangular shape as viewed from above. A connecting portion 16B includes a frame body 161 connected to the arm portions 141 via a rotating shaft 1621 so as to be rotatable about a horizontal x axis and a frame body 162 connected to the frame body 161 via a pin 1611 so as to be rotatable about a horizontal y axis perpendicular to the x axis. A damper 171 for suppressing rotational movement of the frame body 161 around the x axis is provided between the arm portions 141 and the frame body 161, and a damper 172 for suppressing rotational movement of the frame body 162 around the y axis is provided between the frame body 161 and the frame body 162. These dampers 171 and 172 are means for elongating time required for displacement of the first mounting portion 25 such that the posture of the rotary-wing aircraft 10B is not made unstable by sudden displacement of the first mounting portion 25 caused by rotational movement of the frame bodies 161 and 162.

[Fifth Modification]

The present invention is not limited to the case where the rotary-wing aircraft travels in the horizontal direction, and is also applicable to a case where the rotary-wing aircraft travels in a direction including the horizontal direction (that is, a direction having a vector component in the horizontal direction). That is, even in the case where the component force F1 in the direction parallel to the direction of the gravitational force mg described in FIG. 6 is larger or smaller than the gravitational force mg, the difference in the rotational speeds between the rotary wings on the front side and the rear side in the traveling direction can be made smaller than in a conventional case.

[Sixth Modification]

There is no need to install a power source in the rotary-wing aircraft, and, for example, a power source may be installed on the ground, a power supply cable extending from the power source may be connected to the rotary-wing aircraft to supply electric power. In addition, if the altitude is about 15 m, a receiver for non-contact power transmission may be installed in the center portion, the first mounting portion, or the second mounting portion, and electric power may be wirelessly supplied from the ground to the rotary-wing aircraft.

The invention claimed is:

1. A rotary-wing aircraft comprising:
   a plurality of rotary wings;
   an arm portion that supports the plurality of rotary wings;
   a first mounting portion for mounting an object; and
   a connecting portion that connects the first mounting portion to the arm portion in a state in which the first mounting portion is movable within a predetermined range, wherein a position of the connecting portion is
at a position above a point of action, on the rotary-wing aircraft, of a lift generated by the rotation of the rotary wings.

2. The rotary-wing aircraft according to claim 1, wherein, the point of action is
at a center of a circle passing through a rotary shaft of each of the plurality of rotary wing in a plane view.

3. The rotary-wing aircraft according to claim 1, wherein, in a case of moving in a direction including a horizontal direction, a posture of the body is changed by making a rotational speed of a rotary wing located on a rear side in a traveling direction higher than a rotational speed of a rotary wing located on a front side in the traveling direction, and, after the posture of the body is changed, movement in the direction including the horizontal direction is caused by reducing a difference between the rotational speed of the rotary wing located on the front side in the traveling direction and the rotational speed of the rotary wing located on the rear side in the traveling direction.

4. The rotary-wing aircraft according to claim 1, wherein the connecting portion connects a second mounting portion that is disposed on an opposite side to the first mounting portion as viewed from the connecting portion and connected to the first mounting portion to the arm portion together with the first mounting portion.

5. The rotary-wing aircraft according to claim 4, further comprising an antenna mounted on the second mounting portion for receiving a signal for.

6. The rotary-wing aircraft according to claim 1, further comprising a center-of-gravity moving mechanism for moving a center of gravity of the body.

7. The rotary-wing aircraft according to claim 1, further comprising:
a support rod connecting the first mounting portion and the connecting portion, and configured to move relative to the arm portion through the connecting portion, wherein the first mounting portion is connected to an end of the support rod.

8. The rotary-wing aircraft according to claim 7, wherein the support rod is at a non-perpendicular angle with respect to the rotation axis for each of the plurality of rotary wings.

9. The rotary-wing aircraft according to claim 8, further comprising a center portion connecting the arm portion to the connecting portion.

* * * * *